(12) United States Patent
LaMar et al.

(10) Patent No.: US 11,312,342 B1
(45) Date of Patent: Apr. 26, 2022

(54) WHEEL IMMOBILIZATION DEVICE

(71) Applicants: Monte LaMar, Benton, KS (US);
Leeann LaMar, Benton, KS (US)

(72) Inventors: Monte LaMar, Benton, KS (US);
Leeann LaMar, Benton, KS (US)

( * ) Notice: Subject to any disclaimer, the term of this patent is extended or adjusted under 35 U.S.C. 154(b) by 0 days.

(21) Appl. No.: 17/075,895

(22) Filed: Oct. 21, 2020

(51) Int. Cl.
*B60T 3/00* (2006.01)
*B60T 1/02* (2006.01)

(52) U.S. Cl.
CPC ...................................... *B60T 3/00* (2013.01)

(58) Field of Classification Search
CPC ..... B60T 1/02; B60T 1/04; B60T 1/14; B60T 3/00
See application file for complete search history.

(56) References Cited

U.S. PATENT DOCUMENTS

| | | | | |
|---|---|---|---|---|
| 1,937,769 A * | 12/1933 | Lute | ........................ | B60T 3/00 410/20 |
| 3,026,973 A | 3/1962 | Piel | | |
| 3,845,643 A * | 11/1974 | Barrett | ..................... | B60T 3/00 70/18 |
| 4,763,591 A * | 8/1988 | Taylor | ..................... | B63H 8/54 114/39.18 |
| 5,547,045 A * | 8/1996 | Stutzman | ................. | B60T 3/00 188/2 R |
| 5,865,416 A | 2/1999 | Hanaway | | |
| 5,901,632 A * | 5/1999 | Ryan | ..................... | D07B 7/169 87/13 |
| 6,290,029 B1 * | 9/2001 | Gubler | ..................... | B60T 3/00 188/36 |
| 7,121,508 B2 | 10/2006 | Fulcher et al. | | |
| 8,544,912 B1 * | 10/2013 | Matthews | ................. | B66C 1/12 294/74 |
| 2005/0252729 A1 * | 11/2005 | McCay | ..................... | B60T 3/00 188/64 |
| 2008/0149433 A1 * | 6/2008 | Barzilai | ................... | A62B 1/14 188/65.5 |
| 2010/0275757 A1 * | 11/2010 | Hallet | ..................... | F16L 3/127 84/318 |
| 2012/0060278 A1 * | 3/2012 | McCurdy | ................. | D07B 1/02 5/120 |
| 2012/0248695 A1 * | 10/2012 | Butler | .................... | A63B 67/06 273/126 R |

FOREIGN PATENT DOCUMENTS

FR        2690212 A1 * 10/1993 ............. F16G 11/02
JP        2003175076    * 6/2003

* cited by examiner

*Primary Examiner* — Melody M Burch
(74) *Attorney, Agent, or Firm* — Dale J. Ream

(57) ABSTRACT

A wheel immobilization device for preventing unintended movement of a wheel of a mobile object of a type having a wheel includes a rope body that includes a first end and a second end opposite the first end and that has an elongate, pliable, and flexible configuration, the rope body having a plurality of strands twisted together between the first and second ends. The immobilization includes a tail portion situated at the first end of the rope body, the tail portion having a linear configuration and a leader end. The immobilization device includes a retaining portion opposite the tail portion and situated at a second end of the rope body, the retaining portion including a loop that defines a head opening configured and operable to receive the tail portion therethrough.

17 Claims, 7 Drawing Sheets

WHEEL IMMOBILIZATION DEVICE

BACKGROUND OF THE INVENTION

This invention relates generally to wheel stabilization and immobilization devices and, more particularly, to a wheel immobilization device that wraps around a wheel of a vehicle and is retained thereabout until intentionally removed. For sake of clarity, the wheel immobilization device described herein may also be referred to as "wheel chocks" or "rope chocks."

Traditional wheel chocks are wedges of sturdy material placed closely against a vehicle's wheels to prevent accidental movement. Chocks are placed for safety in addition to setting the brakes. Chocks are an added safety measure in case the brakes fail or if the gear shift gets knocked out of gear. Typically, wheel chocks are configured as wedges constructed from blocks of wood or metal.

Although presumably effective for their intended purposes, the existing chock devices are limited to stopping a vehicle's movement in a single direction. Specifically, a wedge may be placed behind or in front of a tire but usually not both and definitely not in every direction. In other words, a typical wheel chock configuration may be ineffective in situations where the vehicle it is associated with changes its location or orientation—as is sometimes the case with small and medium sized aircraft parked outside during periods of high wind, e.g. during a storm, hurricane, tornado, or the like. For instance, if a plane is turned 90 degrees, a wheel chock wedged behind a tire will no longer be able to prevent rolling of the vehicle and damage caused thereby. This invention is also very useful vehicles, planes, shop equipment (for instance a rolling toolbox) and thy: like that castor wheels, i.e. wheels capable of turning 360 degrees.

Therefore, it would be desirable to have a wheel immobilization device (i.e. a wheel chock device) that includes a rope body that has an elongate and pliable configuration, a retaining portion situated at a first end of the rope body, and a second end opposite the first end that is operably configured for receipt through the retaining portion such that the wheel mobilization may be wrapped around a wheel of a vehicle for immobilizing movement of said wheel.

SUMMARY OF THE INVENTION

A wheel immobilization device for preventing unintended movement of a wheel of a mobile object of a type having a wheel includes a rope body that includes a first end and a second end opposite the first end and that has an elongate, pliable, and flexible configuration, the rope body having a plurality of strands twisted together between the first and second ends. The immobilization includes a tail portion situated at the first end of the rope body, the tail portion having a linear configuration and a leader end. The immobilization device includes a retaining portion opposite the tail portion and situated at a second end of the rope body, the retaining portion including a loop that defines a head opening configured and operable to receive the tail portion therethrough.

Important aspects of the invention will be described in detail below but may be summarized as follows:
- Quick and easy application (compared to traditional chocks)
- For small to mid-sized Aircraft, vehicles and equipment
- Easy storage and handling
- Will not damage aircraft/vehicle interiors or exteriors as wood or heavy rubber chocks often do
- No rattling while transporting on ground or aloft
- Impact-Absorbing, Lightweight polypropylene
- Weather & Abrasion Resistant
- Resistant to fuels, oils, and common chemicals
- Lightweight & easy to Use
- High-Visibility yellow with red ends
- Rope retaining device (end fitting) made of durable nylon or polyurethane Therefore, a general object of this invention is to provide a wheel immobilization device that includes a rope body that may be wrapped around a wheel of a vehicle for immobilizing movement of said wheel.

Another object of this invention is to provide a wheel immobilization device, as aforesaid, that is positioned to prevent movement of a vehicle wheel even if the vehicle and wheel becomes turned after the chock is positioned.

Still another object of this invention is to provide a wheel immobilization device, as aforesaid, that includes a rope body that includes a retainer for securing the rope body in a configuration surrounding a tire.

Yet another object of this invention is to provide a wheel immobilization device, as aforesaid, that may sold in multiple sizes so as to be effective on vehicles and sizes of tire/wheel combinations.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 2b is a sectional view taken along line 2b-2b of FIG. 2a;

FIG. 4a is a side view of the wheel immobilization device as in FIG. 3a;

FIG. 4b is a sectional view taken along line 4b-4b of FIG. 4a;

FIG. 6b is a sectional view taken along line 6b-6b of FIG. 6a;

FIG. 7a is a perspective view from a front angle of the quick connect fixtures of FIG. 5a; and FIG. 7b is a perspective view from a rear angle of the quick connect fixtures of FIG. 7a.

DESCRIPTION OF THE PREFERRED EMBODIMENT

Figure 1A:
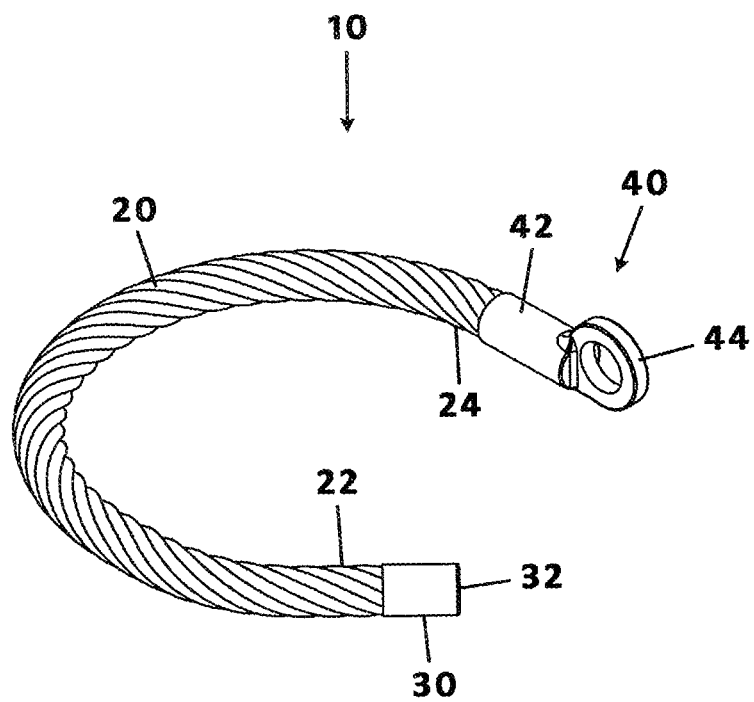
FIG. 1a is a perspective view of a wheel immobilization device according to a preferred embodiment of the present invention.

A wheel immobilization device according to a preferred embodiment of the present invention will now be described with reference to FIG. 1a to 7b of the accompanying drawings. The wheel immobilization device 10 includes a rope body 20, retaining portion 40, and a tail portion 30 operable to extend though the retaining portion 40.

The wheel mobilization device 10 includes a rope body 20 having a configuration that allows it to be wrapped around the wheel of a vehicle—such as a wheel of an airplane, automobile, sport utility vehicle (SUV), golf cart, or any mobile vehicle of a type having a wheel/tire combination. More particularly, the rope body 20 has an elongate configuration that is pliable and flexible. As with any rope, the rope body 20 is linear when laid straight but may is pliable to manually wrap around a wheel 12. The rope body 20 may be constructed and marketed in various lengths and diameters so as to secure vehicles of different sizes. Preferably, the present invention may be marketed in diameters of ¼ inch to 3 inches. For ease of description, the rope body 20 is represented as having a first end 22 and a second end 24 opposite the first end 22.

Preferably, the rope body 20 may be constructed of polypropylene although natural fibers such as cotton or linen may be suitable or synthetic fibers such as nylon, polyester, polyethylene, Ara ids, and acrylics may also be suitable. Polypropylene is preferred because of its resistance to most common chemicals, is resistant to rot, and to ultraviolet light. Further, the rope body 20 may be constructed according to a process and materials that includes a plurality of fibers twisted together so as to form a plurality of twisted yarns, the plurality of twisted yarns being braided together so as to form a plurality of braided strands, and then the plurality of the braided strands being braided together so as to form the rope body 20.

Further, the wheel immobilization device 10 includes a tail portion 30 and a retaining portion 40, both of which continue the elongate configuration of the rope body 20. More particularly, the tail portion 30 is connected to the first end 22 of the rope body 20. In fact, the tail portion 30 may have a unitary construction with the rope body 20 and may continue the linear configuration and cross-sectional diameter of the rope body 20 when laid in a straight configuration. Importantly, the tail portion 30 may include a leader end 32 having a diameter that is smaller than a diameter of the remainder of the tail portion 30 and having a tubular configuration—both of which enhance passage of the tail portion 30 through the retaining portion 40 as explained below. Further, the bare end may use a heat shrink construction that prevents the rope from unraveling.

Similarly, the retaining portion 40 is coupled to the second end 24 of the rope body 20. In fact, the retaining portion 40 may have a unitary construction with the rope body 20 and may continue the linear configuration and cross-sectional diameter of the rope body 20 when laid in a straight configuration. The retaining portion 40 includes a tubular head section 42 and a flange configured as a loop 44. The loop 44 has a circular configuration and defines a head opening 46 of larger diameter than a diameter of the tail portion 30. In other words, the head open is large enough to receive first the leader end 32 first and then tail portion 30 therethrough. The loop 44 is configured to receive and retain the tail portion 30—such as when wound around a wheel of a plane or automobile.

As shown in the drawings, the leader end 32 of the tail portion 30 has a configuration that is non-deformable. Similarly, at least the loop 44 and head opening 46 of the retaining portion 40 are constructed of a non-deformable material, the head opening 46 being larger than a diameter of the leader end 32 for receipt thereof without deformity of either.

In still another aspect, portions of the rope body 20 may include indicia suitable for identification. More particularly, the tail portion 30 may include a tail color indicia and the retaining portion 40 may include a retainer color indicia that is different than said tail color indicia (illustrated with a difference in cross-hatching in FIG. 1). For instance, the rope body 20 may be yellow while the retaining portion and tail portion 30 may be red so that manipulation and visual perception of the immobilization device 10 is enhanced. Other color combinations, of course, are possible.

In another embodiment, the ends of the rope body 20 may be fastened together in a quick-connect attachment (FIGS. 5b to 7b). Specifically, in this embodiment, the loop 44 is omitted from retaining portion 40 and may be replaced by a flange 50 such as a collar, disc, pin, button, male fastener, or the like. Similarly, the free end of the tail portion 30 coupled to the rope body 20 may include a receiver fastener 52 configured to selectively receive or otherwise mate with the flange 50 in a quick connect friction-fit attachment. The receiver fastener 52 may be a sleeve, clamp, carabineer, or the like. In use, the flange 50 and receiver fastener 52 may be quickly coupled or mated together simply be touching or twisting them together after wrapping the rope body 20 around a tire of a vehicle to be made stationary.

Figure 3A:
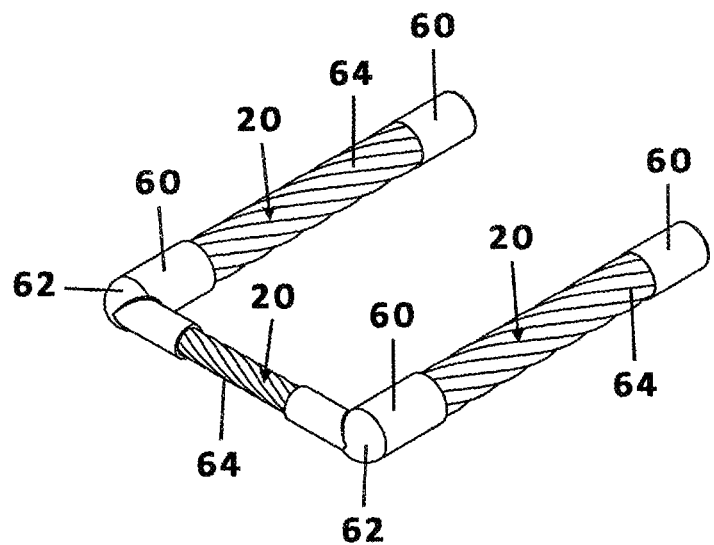
FIG. 3a is a perspective view of the wheel mobilization device according to the present invention, illustrated in an arrangement to be deployed around a tandem tire configuration.
Figure 3B:
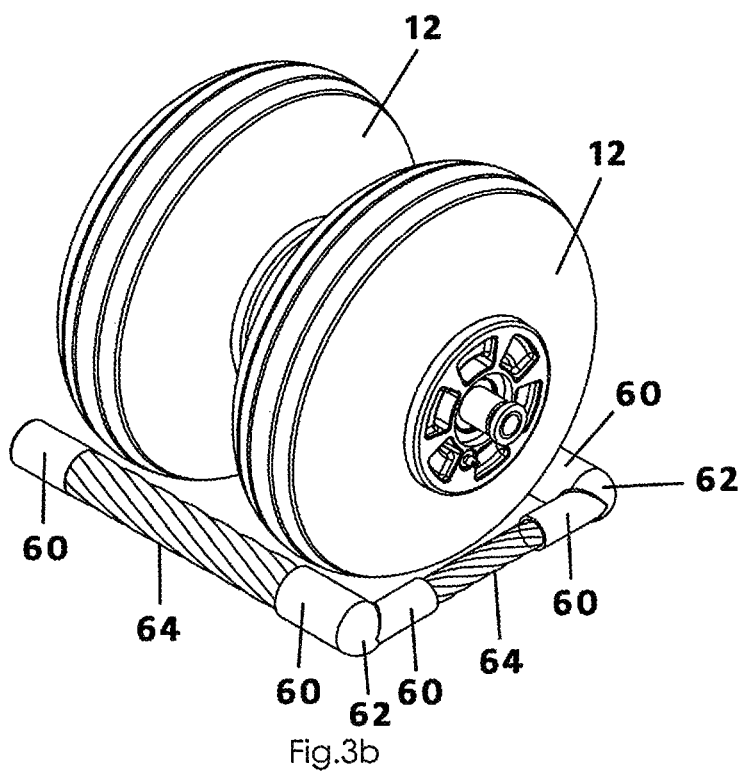
FIG. 3b is a perspective view of the wheel immobilization device as in FIG. 3a deployed about a tandem tire configuration.
Figure 4A:
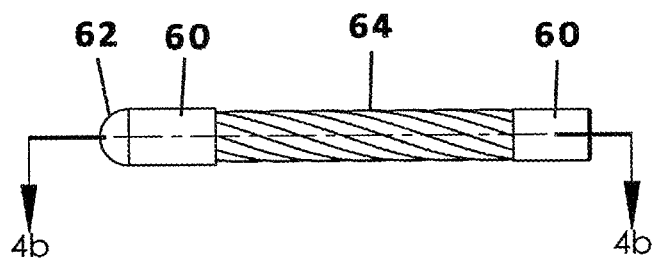
Figure 4B:
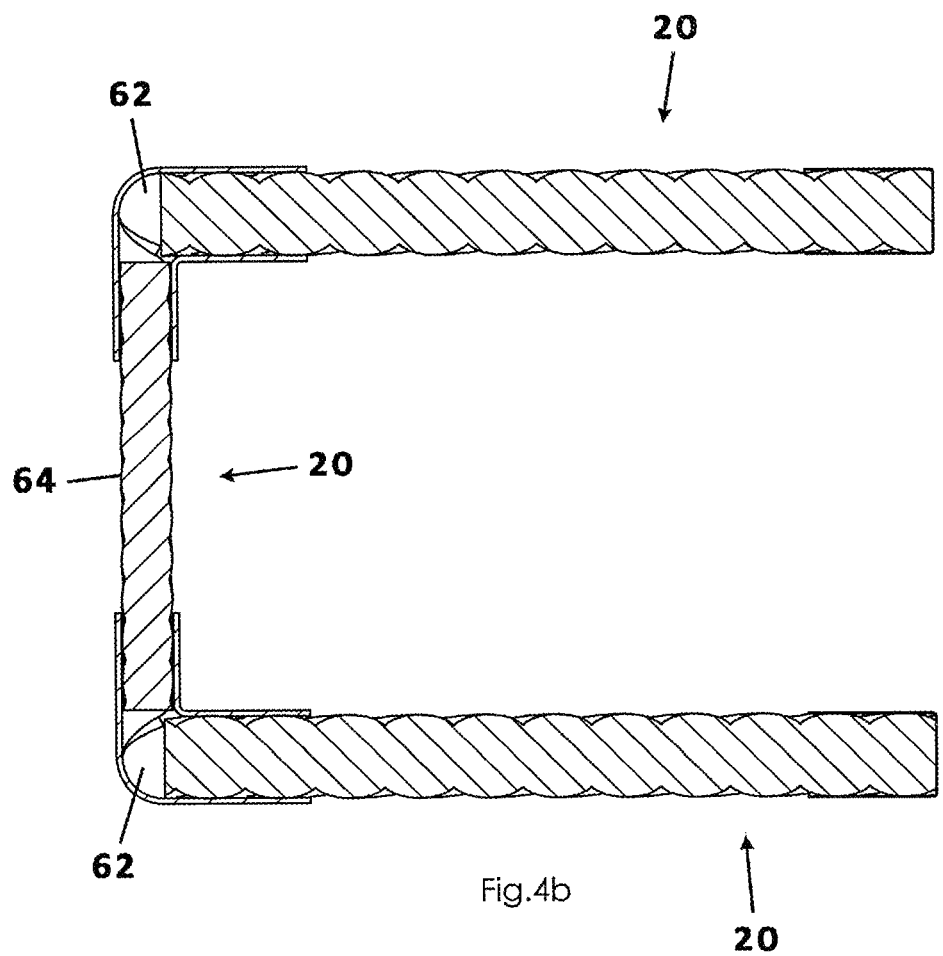
Figure 5A:
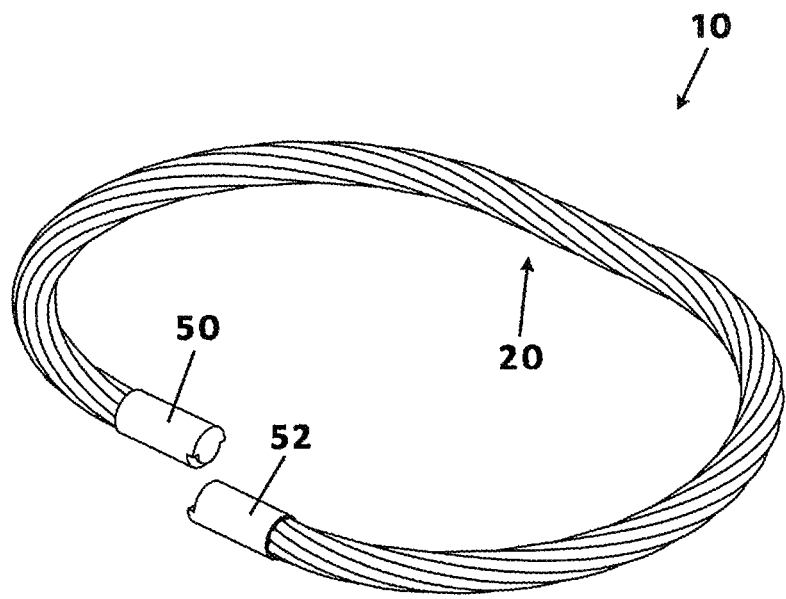
FIG. 5a is a perspective view of a wheel immobilization device having quick connection fasteners at opposed end of the rope body, illustrated in a released configuration.
Figure 5B:
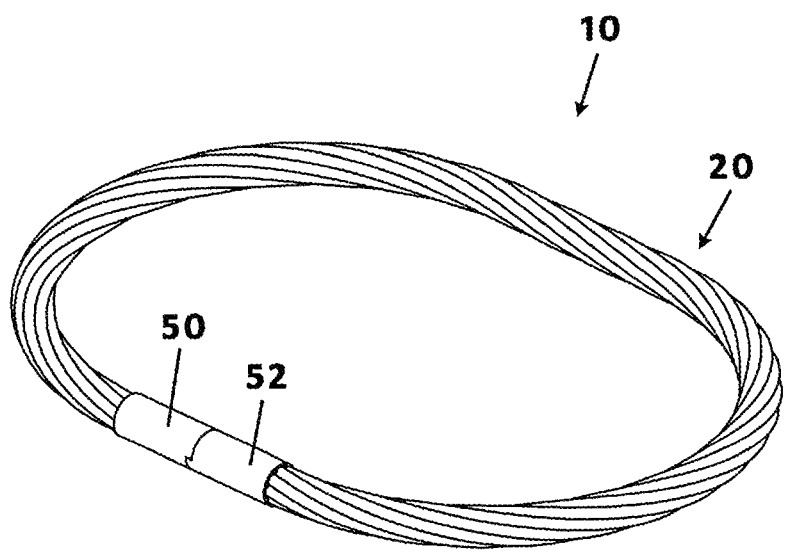
FIG. 5b is a perspective view of the wheel immobilization device as in FIG. 5a, illustrated in a coupled configuration.
Figure 6A:
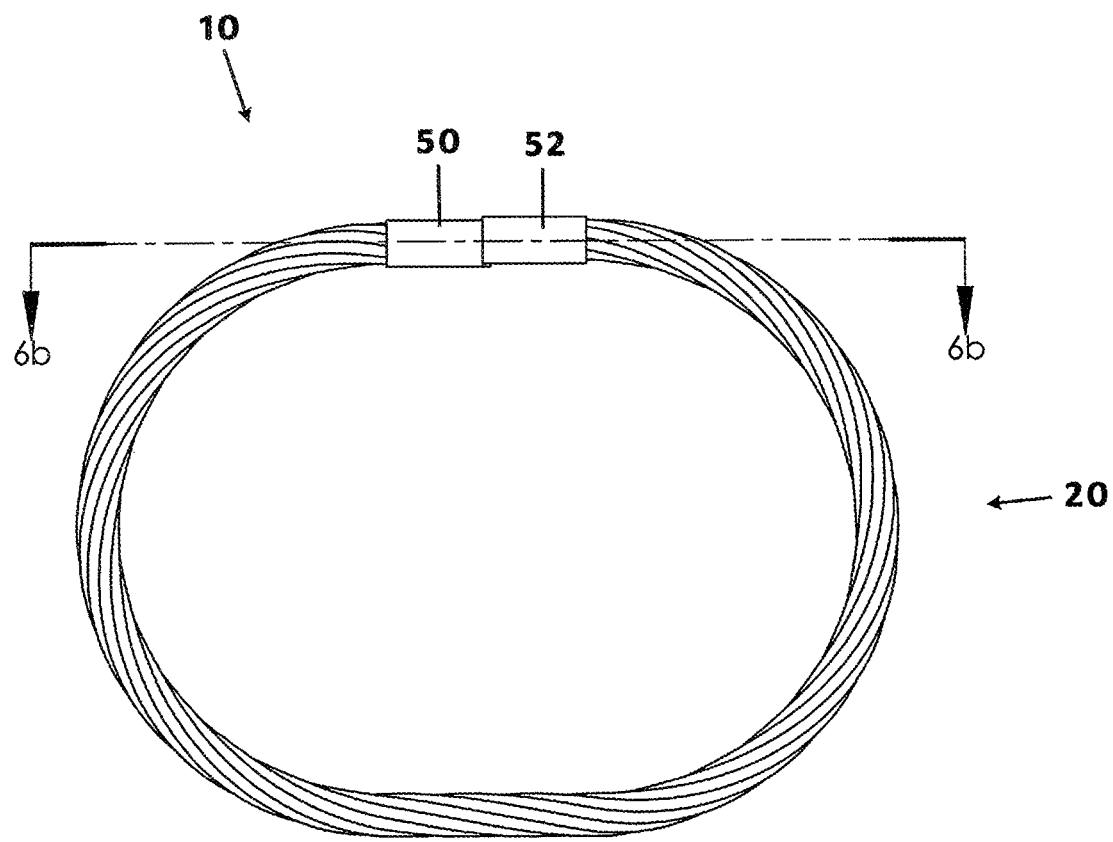
FIG. 6a is a top view of the wheel immobilization device as in FIG. 5b.
Figure 6B:
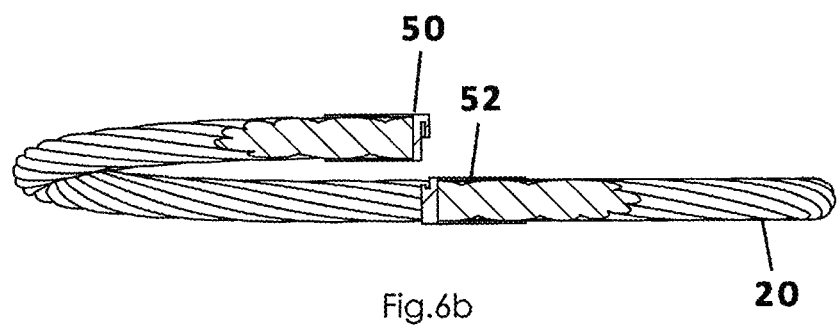
Figure 7A:
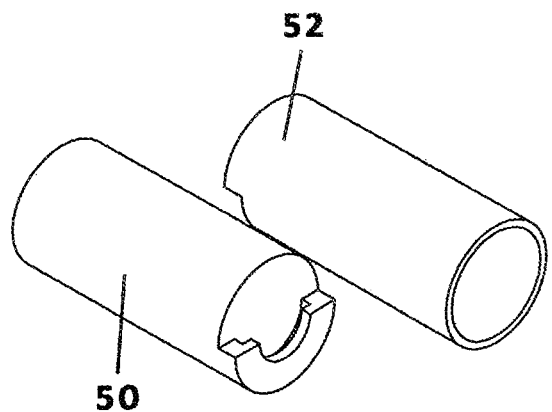
Figure 7B:
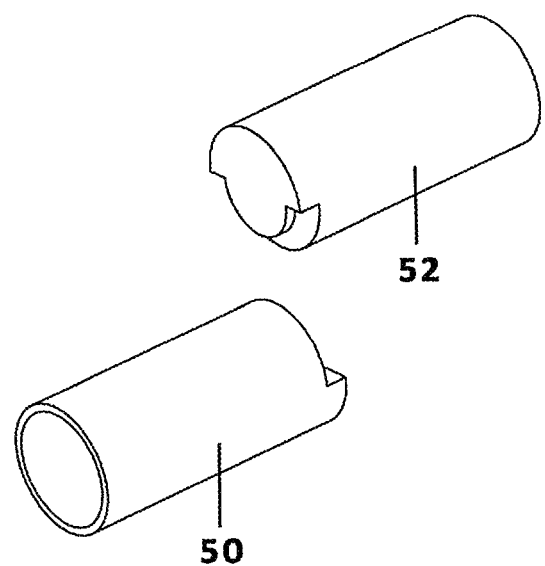

A related embodiment of a immobilization device 20 is shown in FIGS. 3a and 3b, and is substantially similar to the embodiment first described except as noted below. Specifically, both opposed ends of the rope body 20 may include an end cap 60, Again, the retaining portion 40 does not include a loop 44. More particularly, the wheel immobilization device 10 may include multiple rope portions 64 terminated by and separated by end caps 60 and coupled at respective right angles by elbow fittings 62. As shown, the multiple rope portions 64 are references to specific sections of the rope body 20 generally. It will be understood that this embodiment may be particularly suited for forming a rectangular configuration for surrounding a vehicle having tandem wheel/tire configuration, as is common with larger airplanes.

Figure 1B:
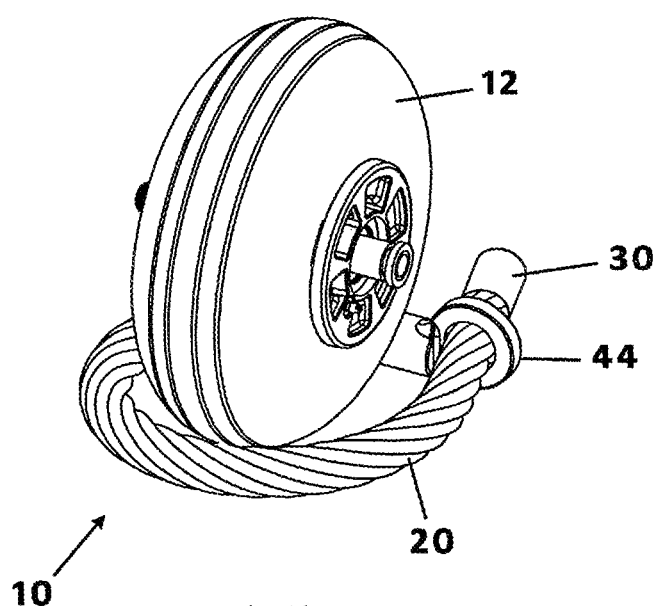
FIG. 1b is another perspective view of the wheel immobilization device, illustrated deployed about a tire of an airplane.
Figure 2A:
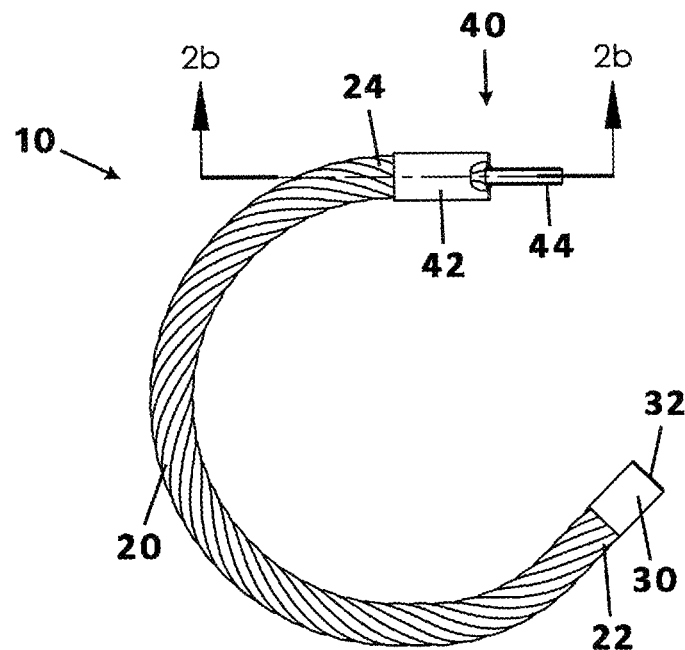
FIG. 2a is a top view of the wheel immobilization device as in FIG. 1.
Figure 2B:
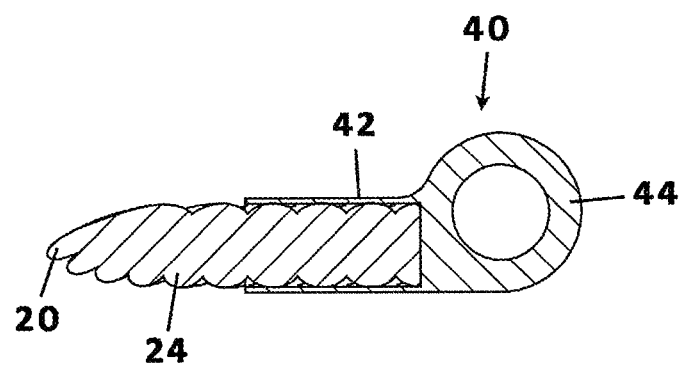

FIG. 1b shows the preferred usage of the immobilization device 10 according to present invention. Namely, the pliable rope body shown in FIG. 1a may be wrapped 360 degrees around a tire and the tail portion 30 inserted through the loop 44 of the retaining portion.

It is understood that while certain forms of this invention have been illustrated and described, it is not limited thereto except insofar as such limitations are included in the following claims and allowable functional equivalents thereof.

The invention claimed is:

1. A wheel immobilization device for preventing unintended movement in any direction of a wheel of a movable object of a type having a wheel, said wheel immobilization device comprising:
   a rope body that includes a first end and a second end opposite said first end and that has an elongate, pliable, and flexible configuration, said rope body having a plurality of strands twisted together between said first and second ends;

a tail portion situated at said first end of said rope body, said tail portion having a linear configuration and a leader end having a non-deformable configuration;

wherein said leader end is a tube having a heat shrink construction; and a retaining portion attached to said second end of said rope body, said retaining portion including a loop having a circular construction that defines a head opening having a non-variable diameter complementary in shape and diameter to a shape and diameter of said leader end for receiving said tail portion therethrough such that said rope body, said tail portion, and said retaining portion form a complete loop.

2. The wheel mobilization device as in claim 1, wherein said retaining portion includes a tubular member coupled to said second end of said rope body and situated adjacent said head.

3. The wheel mobilization device as in claim 1, wherein said rope body includes a first color indicia and said tail portion and said retaining portion include a second color indicia that is different than said first color indicia.

4. A wheel immobilization device for preventing unintended movement in any direction of a wheel of a movable object of a type having a wheel, said wheel immobilization device comprising:

a rope body that includes a first end and a second end opposite said first end and that has an elongate, pliable, and flexible configuration, said rope body having a plurality of strands twisted together between said first and second ends;

a tail portion situated at said first end of said rope body, said tail portion including a receiving fastener that is an end cap having a tubular shrink wrapped construction having a non-deformable shape; and a retaining portion opposite said tail portion and situated at a second end of said rope body, said retaining portion including a collar having a non-deformable shape configuration for selectively receiving said receiving fastener of said tail portion such that said rope body, said tail portion, and said retaining portion form a complete loop.

5. The wheel immobilization device as in claim 4 wherein said tail portion includes an indicia and said retaining portion includes an indicia that is different than said indicia of said tail portion.

6. The wheel immobilization device as in claim 5, wherein said indicia associated with said retaining portion and said indicia associated with said tail portion is a color indicia.

7. The wheel mobilization device as in claim 6, wherein said rope body includes:

a plurality of fibers twisted together so as to form a plurality of twisted yarns;

said plurality of said twisted yarns being braided together so as to form a plurality of braided strands; and said plurality of said braided strands being braided together so as to form said rope body.

8. The wheel mobilization device as in claim 4, wherein said rope body defines a diameter of 3 inches.

9. The wheel mobilization device as in claim 4, wherein said rope body defines a diameter of between ¼ and 3 inches.

10. A method for preventing unintended movement in any direction of a movable object of a type having a wheel, comprising:

wrapping a rope body tightly around the wheel, said rope body including a first end and a second end opposite said first end and that has an elongate, pliable, and flexible configuration, said rope body having a plurality of strands twisted together between said first and second ends;

providing a tail portion at said first end of said rope body that includes a receiving fastener that is an end cap having a tubular shrink wrapped construction having a non-deformable shape;

providing a retaining portion opposite said tail portion and situated at a second end of said rope body, said retaining portion including a collar defining a circular opening having a non-deformable shape configuration;

said collar of said retaining portion receiving said receiving fastener of said tail portion such that said rope body, said tail portion, and said retaining portion form a complete loop;

after receiving said tail portion through said collar, pulling on said tail portion so as to tighten said rope body about said wheel.

11. The method as in claim 10 wherein said tail portion includes an indicia and said retaining portion includes an indicia that is different than said indicia of said tail portion.

12. The method as in claim 11, wherein said indicia associated with said retaining portion and said indicia associated with said tail portion is a color indicia.

13. The method as in claim 10, wherein said rope body includes:

a plurality of fibers twisted together so as to form a plurality of twisted yarns;

said plurality of said twisted yarns being braided together so as to form a plurality of braided strands; and said plurality of said braided strands being braided together so as to form said rope body.

14. The method as in claim 10, wherein said rope body defines a diameter of 2 inches.

15. The method as in claim 10, wherein said rope body defines a diameter of 3 inches.

16. The method as in claim 10, wherein said rope body defines a diameter of between ¼ and 3 inches.

17. The wheel mobilization device as in claim 4, wherein said rope body defines a diameter of 2 inches.

* * * * *